(12) United States Patent
Chang

(10) Patent No.: US 6,952,646 B2
(45) Date of Patent: Oct. 4, 2005

(54) TRACKING DEVICE AND ASSOCIATED SYSTEM AND METHOD

(75) Inventor: Yu-Wen Chang, Rancho Palos Verdes, CA (US)

(73) Assignee: Chang Industry, Inc., La Verne, CA (US)

( * ) Notice: Subject to any disclaimer, the term of this patent is extended or adjusted under 35 U.S.C. 154(b) by 0 days.

(21) Appl. No.: 10/438,302

(22) Filed: May 14, 2003

(65) Prior Publication Data
US 2004/0230372 A1 Nov. 18, 2004

(51) Int. Cl.⁷ .............................. G01S 1/02; G01C 21/00
(52) U.S. Cl. .................. 701/207; 701/214; 342/357.07; 340/426.19
(58) Field of Search ........................ 701/207, 214–216; 342/357.06, 357.07; 340/988, 989, 993, 426.1, 426.11, 426.13, 426.14, 426.15, 426.16, 426.17, 426.19; 455/456.6

(56) References Cited

U.S. PATENT DOCUMENTS

| | | | | |
|---|---|---|---|---|
| 4,818,998 A | * | 4/1989 | Apsell et al. | 342/444 |
| 5,731,785 A | * | 3/1998 | Lemelson et al. | 342/357.07 |
| 5,895,436 A | * | 4/1999 | Savoie et al. | 701/214 |
| 5,914,675 A | * | 6/1999 | Tognazzini | 340/989 |
| 5,986,543 A | * | 11/1999 | Johnson | 340/426.19 |
| 6,140,956 A | * | 10/2000 | Hillman et al. | 342/357.07 |
| 6,184,801 B1 | * | 2/2001 | Janky | 340/988 |
| 6,392,565 B1 | * | 5/2002 | Brown | 340/988 |
| 6,559,769 B2 | * | 5/2003 | Anthony et al. | 340/574 |
| 6,744,403 B2 | * | 6/2004 | Milnes et al. | 342/357.07 |
| 2003/0128104 A1 | * | 7/2003 | Lessard et al. | 340/426.11 |

* cited by examiner

Primary Examiner—Gary Chin
(74) Attorney, Agent, or Firm—Alston & Bird LLP

(57) ABSTRACT

A system for tracking a vehicle is provided. Such a system comprises a tracking device including a location-determining apparatus configured to determine a location, a signaling device operably engaged with the location-determining apparatus and adapted to transmit a signal, including a location signal corresponding to the location, to a station remotely disposed with respect to the location-determining apparatus, and a securing apparatus operably engaged with the location determining apparatus and adapted to secure the location-determining apparatus to the vehicle while the vehicle is moving. A deployment vehicle is configured to transport the tracking device and deploy the tracking device onto the vehicle so as to thereby allow the securing apparatus to secure the tracking device to the vehicle such that the vehicle can be remotely tracked from the station in response to the location signal. An associated device and method are also provided.

25 Claims, 4 Drawing Sheets

TRACKING DEVICE AND ASSOCIATED SYSTEM AND METHOD

BACKGROUND OF THE INVENTION

1. Field of the Invention

The present invention relates to the remote tracking of a vehicle and, more particularly, to a selectively deployable tracking device and associated system and method.

2. Description of Related Art

A high speed chase, in which a suspect in a vehicle is fleeing from law enforcement, is an all too common and very dangerous occurrence. Many times, the fleeing vehicle is pursued from the air, such as by a helicopter, and from the ground by one or more police cars. However, the pressure of the pursuit often causes the suspect to drive erratically and at a high rate of speed, thereby possibly resulting in injury to innocent bystanders, damage to other vehicles or property, and/or loss of life. Such pursuits are also hazardous to the pursuing law enforcement officers as well as costly, often requiring significant police manpower, equipment, and time. In some instances, the commuting public may be significantly inconvenienced by traffic delays caused by such incidents. Accordingly, certain jurisdictions have enacted regulations for restricting such police chases under certain conditions. However, such a solution has the negative effect of allowing the suspect to escape if conditions exist which cause the police to terminate the chase. Further, instead of pursuing the suspect, other manners of halting the suspect's vehicle have been developed such as, for example, spike strips. However, just like roadblocks, such measures typically require law enforcement to correctly anticipate the direction in which the suspect will flee, and thus may not often be successful in halting the suspect.

In many instances, on the other hand, if the fleeing suspect perceives the ability of escaping without being followed by law enforcement, the suspect may tend to drive normally so as to escape detection, thereby reducing the risk of damage, injury and/or death. Thus, there exists a need for a method, apparatus, and/or system capable of effectively tracking a fleeing suspect in such a manner that the risks and costs of a high speed pursuit are reduced and/or minimized.

BRIEF SUMMARY OF THE INVENTION

The above and other needs are met by the present invention which, in one embodiment, provides a device adapted to track a vehicle. Such a device includes a location-determining apparatus configured to be capable of determining a location and a signaling device operably engaged with the location-determining apparatus and adapted to be capable of transmitting a signal, including a location signal corresponding to the location, to a station remotely disposed with respect to the location-determining apparatus. A securing apparatus is operably engaged with the location determining apparatus and is adapted to be capable of securing the location-determining apparatus to the vehicle while the vehicle is moving so as to allow the vehicle to be remotely tracked from the station in response to the location signal.

Another advantageous aspect of the present invention comprises a system adapted to track a vehicle. Such a system includes a tracking device having a location-determining apparatus configured to be capable of determining a location and a signaling device operably engaged with the location-determining apparatus and adapted to be capable of transmitting a signal, including a location signal corresponding to the location, to a station remotely disposed with respect to the location-determining apparatus. A securing apparatus is operably engaged with the location determining apparatus and is adapted to be capable of securing the location-determining apparatus to the vehicle while the vehicle is moving. A deployment vehicle is configured to be capable of transporting the tracking device and deploying the tracking device onto the vehicle so as to thereby allow the securing apparatus to secure the tracking device to the vehicle such that the vehicle can be remotely tracked from the station in response to the location signal.

Still another advantageous aspect of the present invention comprises a method of tracking a vehicle with a tracking device comprising a location-determining apparatus configured to be capable of determining a location, a signaling device operably engaged with the location-determining apparatus and adapted to be capable of transmitting a signal, including a location signal corresponding to the location, to a station remotely disposed with respect to the location-determining apparatus, and a securing apparatus operably engaged with the location determining apparatus and adapted to be capable of securing the location-determining apparatus to the vehicle while the vehicle is moving. First, the tracking device is deployed from a deployment vehicle onto the vehicle. The tracking device is then secured to the vehicle with the securing apparatus. Upon receiving the location signal at the station, the vehicle can then be remotely tracked from the station in response to the location signal.

Thus, advantageous embodiments of the present invention provide distinct advantages as further detailed herein.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 3:
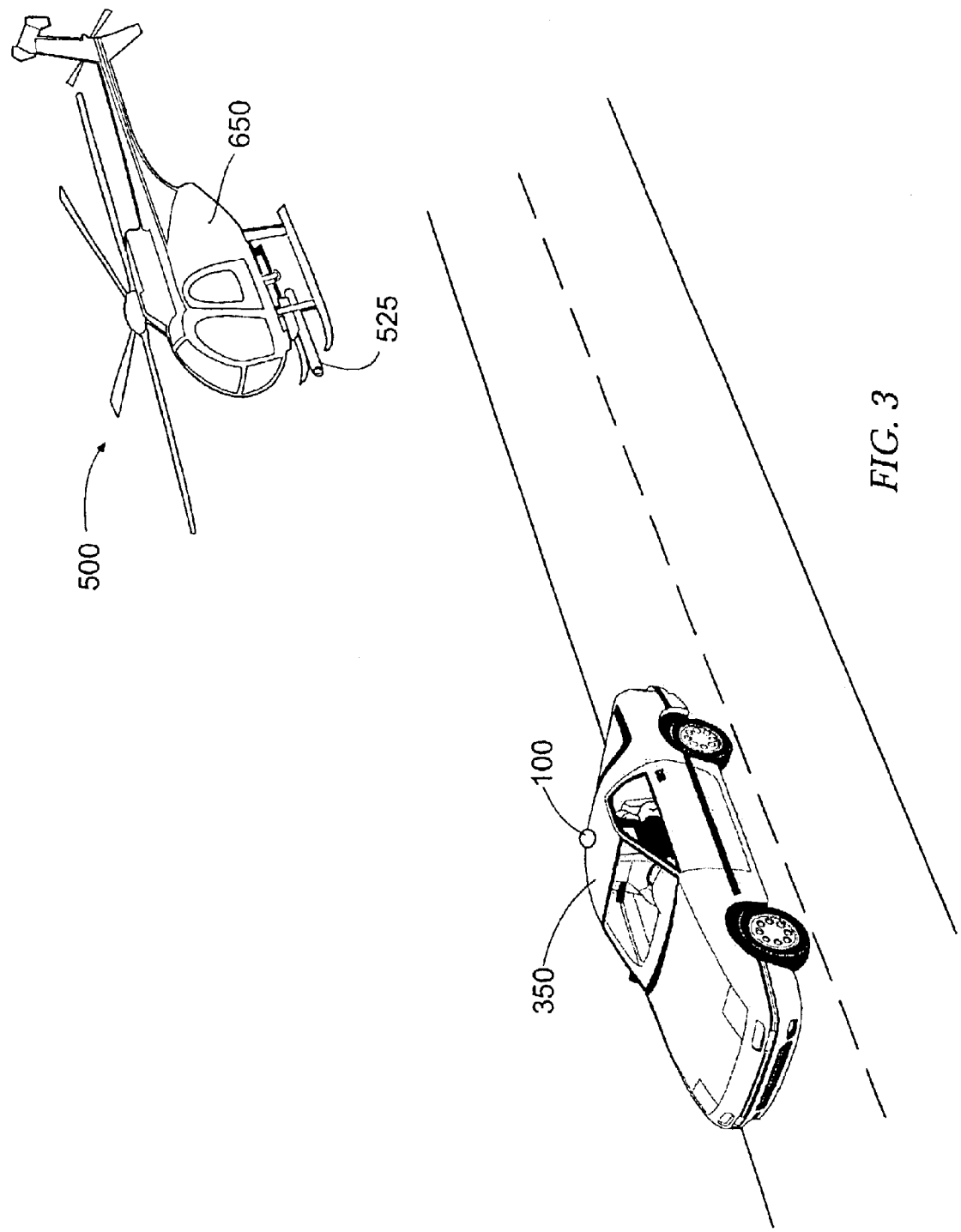
Figure 4:
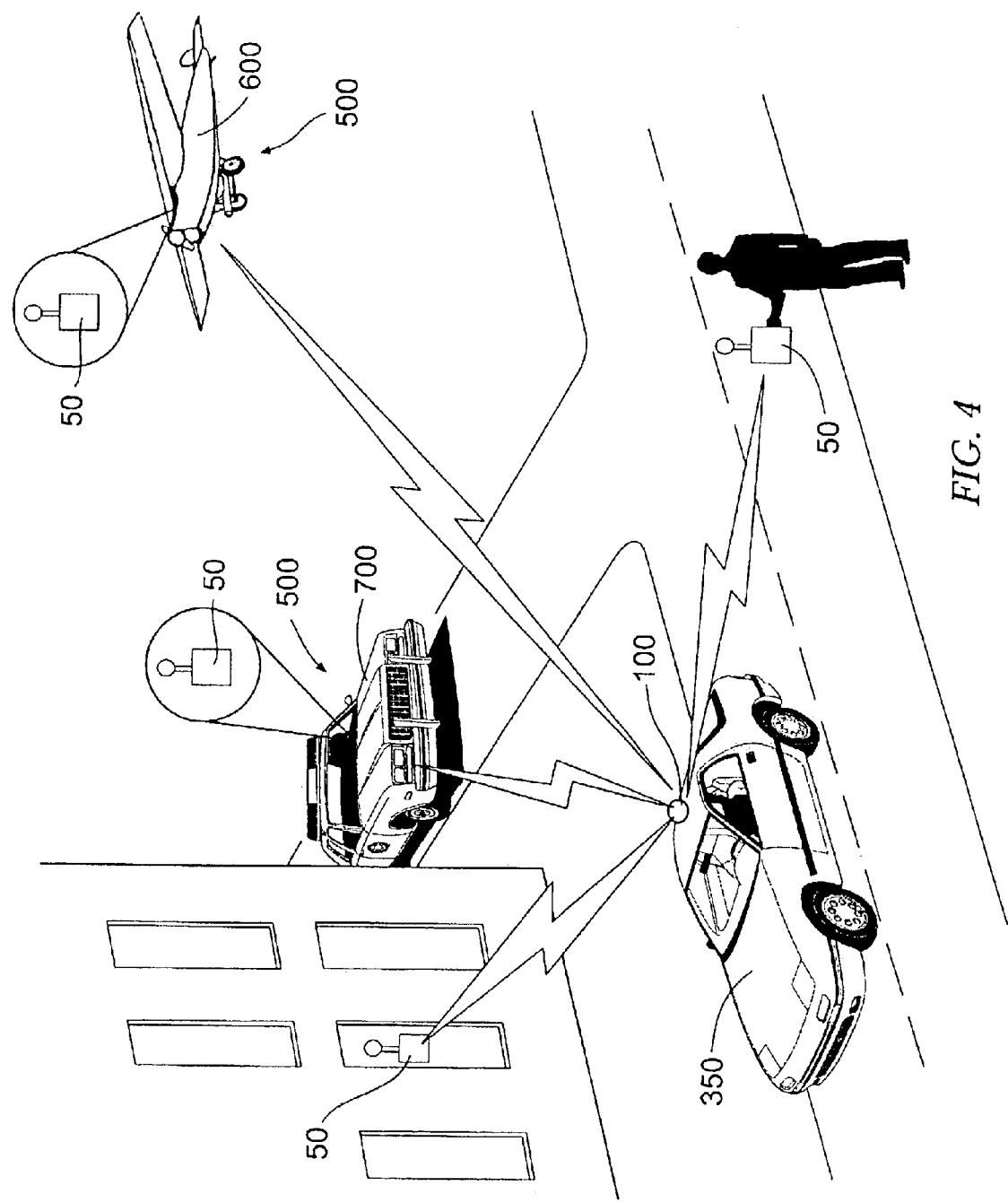

FIG. 3 is a schematic of a system for tracking a vehicle according to one embodiment of the present invention illustrating a tracking device being deployed from a deployment vehicle toward the vehicle to be tracked; and FIG. 4 is a schematic of a system for tracking a vehicle according to one embodiment of the present invention illustrating a vehicle being tracked via a tracking device deployed from a deployment vehicle and attached by a securing device to the vehicle to be tracked.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
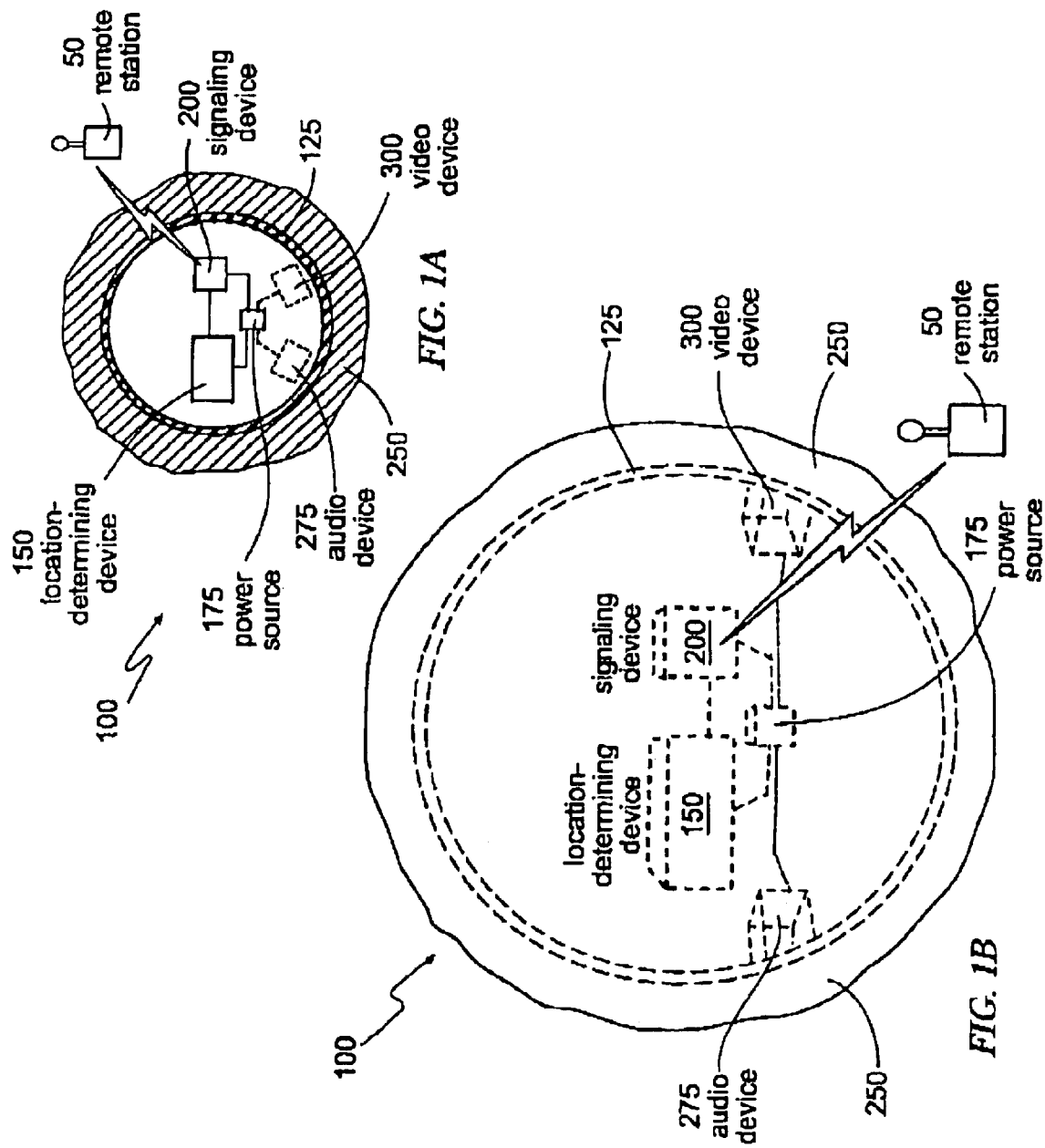
FIGS. 1A and 1B show plan view and perspective view cross-sectional schematics of a tracking device according to one embodiment of the present invention in which the tracking device is generally shaped as a ball.
Figure 2:
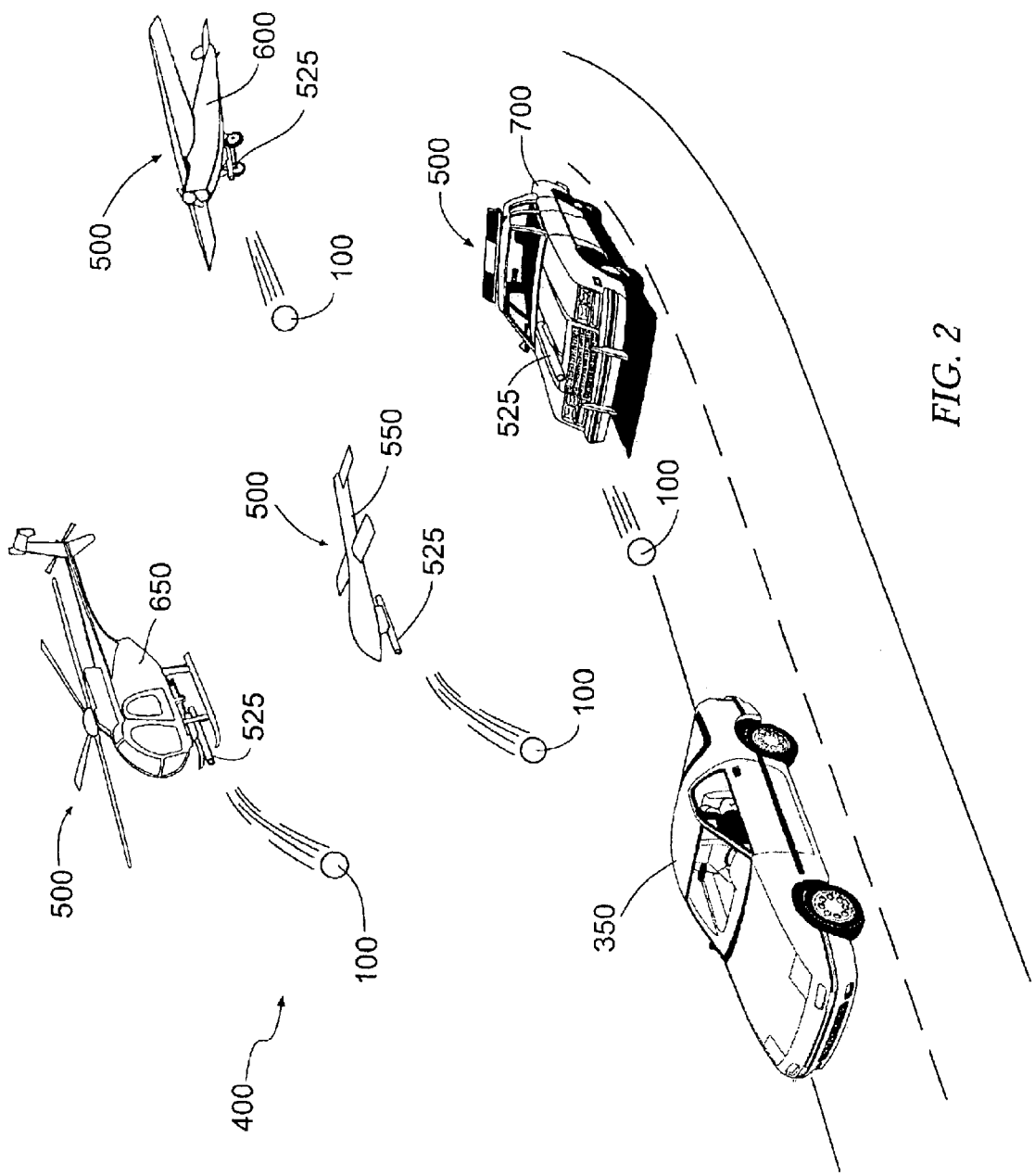
FIG. 2 is a schematic of a system for tracking a vehicle according to one embodiment of the present invention.

FIG. 1 schematically illustrates a tracking device according to one embodiment of the present invention and as used in a system as shown in FIGS. 2–4, the tracking device being indicated generally by the numeral 100. The tracking device 100 comprises a location-determining device 150, a signaling device 200, and a securing device 250. The location-determining device 150 may comprise, for example, a Global Positioning System (GPS) device or other suitable device capable of determining a location of the tracking device 100, whereby the location of the tracking device 100, whether mobile or stationary, can then be monitored by a station 50 disposed remotely thereto, as described further herein. Such a location may be determined, for example, as a set of geodetic coordinates indicating a particular latitude and longitude. The signaling device 200 is in communication or otherwise operably engaged with the location-determining device 150 and may comprise, for example, a transmitter device or a transceiver device, as will be appreciated by one skilled in the art. That is, the signaling device 200 is configured to receive the location determined by the location-determining device 150 and to at least transmit a location signal corresponding to the location to the station 50, wherein the station 50 may be mobile or stationary, so as to allow the location of the tracking device 100 to be remotely monitored. The communication between the signaling device 200 and the remote station 50 may be accomplished over a wireless link, as will be appreciated by one skilled in the art, though, in some instances, the signaling device 200 may also be configured to be in communication with the station 50 via a wireline communication link as an alternative or in addition to the wireless link.

According to some advantageous embodiments of the present invention, the location-determining device 150 and the signaling device 200 may be housed in or otherwise associated with a housing 125. In some instances, the housing 125 is, for example, compact, wear resistant, impact resistant, moisture resistant, and configured such that the location-determining device 150 and/or the signaling device 200 may be mounted therein so as to be protected by the housing 125. The housing 125, in some embodiments and as shown, may be shaped as a ball, though one skilled in the art will appreciate that many different shapes of such a housing are within the spirit and scope of the present invention. In addition, the tracking device 100 further comprises a power source 175 in operative engagement with the location-determining device 150 and/or the signaling device 200 for providing the necessary electrical power for allowing the respective components to be operable, wherein such a power supply 175 may comprise, for example, a battery, solar cell, or the like, as will be appreciated by one skilled in the art.

Other embodiments of the present invention may include, for example, an audio device 275 and/or a video device 300 (shown in phantom in FIG. 1) operably engaged with the tracking device 100. In instances where a housing 125 is implemented, the audio and/or video devices 275, 300 may be contained within the housing 125, attached thereto, or otherwise integrated therewith. When implemented, the audio and video devices 275, 300 are capable of capturing audio and video signals, respectively, at the tracking device 100. In such instances, the signaling device 200, as well as the power source 175, may also be in communication with or otherwise operably engaged with the audio and/or video devices 275, 300 and configured to transmit the audio and/or video signal, respectively, to the station 50 such that sounds and images about the tracking device 100 may also be remotely monitored. In other instances, the signaling device 200 may be configured to receive a signal from the station 50. For example, the audio and video devices 275, 300 may be configured to be capable of broadcasting an audio and a video signal, respectively. In such instances, for example, a voice warning or visual indicia may be broadcast from the remote station 50 through the tracking device 100. Accordingly, such configurations would allow two-way audio and/or video communication between the tracking device 100 and the remote station 50.

In some particularly advantageous embodiments, the securing device 250 is attached to or otherwise operably engaged with the housing 125. However, in other instances, the securing device 250 may be attached to or otherwise operably engaged with the location-determining device 150 and/or the signaling device 200, or a separate securing device 250 may be attached to each of the location-determining device 150 and the signaling device 200, as will be appreciated by one skilled in the art. The securing device 250 is particularly configured so as to attach or otherwise secure the housing 125, the location-determining device 150, and/or the signaling device 200 to a vehicle 350 driven, for example, by a suspect fleeing from law enforcement officers. The securing device 250 may comprise, for example, a magnetic apparatus configured to magnetically attach the housing 125, the location-determining device 150, and/or the signaling device 200 to the vehicle 350 without interfering with the operation of the location-determining device 150 and/or the signaling device 200. In other instances, the securing device 250 may comprise, for example, an adhesive substance for attaching the housing 125, the location-determining device 150, and/or the signaling device 200. Such an adhesive substance may be, for example, permanent or nonremovable, require a particular solvent for removal thereof, or otherwise temporary, wherein a temporary adhesive substance may require, for instance, a certain removal force to be applied thereto or a particular extent of environmental degradation to occur in order to allow the securing device 250 to be removed from the vehicle 350.

Another advantageous aspect of the present invention comprises a system for tracking a vehicle 350 as shown in FIGS. 2–4, the system being indicated by the numeral 400. Such a system 400 comprises a tracking device 100, as previously described, and a deployment vehicle 500. Such a deployment vehicle 500 may comprise, for example, an unmanned aerial vehicle (UAV) 550 or a manned aerial vehicle such as, for instance, an airplane 600 or a helicopter 650. In other instances, the deployment vehicle 500 may comprise a ground vehicle (not shown) such as a car, truck or motorcycle, or a waterborne vehicle (not shown) if the tracking function is accomplished on the water. Accordingly, the deployment vehicle 500 is configured to selectively deploy the tracking device 100, where necessary, onto the vehicle 350 so as to allow the vehicle to be remotely tracked from the station 50.

The selective deployment of the tracking device 100 from the deployment vehicle 500 may be accomplished in many different manners, as will be appreciated by one skilled in the art and within the spirit and scope of the present invention. For example, the tracking device 100 may be configured to be dropped from the deployment vehicle 500 onto the vehicle 350 to be tracked, wherein the securing device 250 may be configured with respect to the housing 125, the location-determining device 150, and/or the signaling device 200 so as to be capable of attaching the tracking device 100 to the vehicle regardless of the orientation or velocity at which the tracking device 100 contacts the vehicle 350. In other instances, the tracking device 100 may be configured, for example, to be self-propelled when deployed by the deployment vehicle 500, or the deployment vehicle 500 may be equipped with a launching device 525 capable of launching and propelling the tracking device 100 toward and into engagement with the vehicle 350 so as to allow the securing device 250 to attach the tracking device 100 to the vehicle 350. Further, the securing device 250, in these instances, may also be configured so as to be capable of attaching the tracking device 100 to the vehicle 350 as appropriate with respect to the orientation, speed, direction, or other parameters with which the tracking device 100 is deployed toward the vehicle 350 by the deployment vehicle 500. One skilled in the art will also appreciate that the manner in which the tracking device 100 is deployed by the deployment vehicle 500 should be sufficiently accurate so as to maximize the probability that the tracking device 100 will be effectively attached to the vehicle 350. Accordingly, where necessary, the tracking device 100, deployment vehicle 500, and/or launching device 525 may include an appropriate aiming or guide device (not shown) for directing the tracking device 100 to the vehicle 350.

According to embodiments of the present invention, the station 50 may comprise, for example, a stationary remote site such as a monitoring station in a building, or the station 50 may be incorporated into any of the deployment vehicles 500 or other designated vehicles. In other instances, the station 50 may comprise a portable device which may be transported by a designated person. Further, any of the stations 50 may be, in some instances, configured to relay the location signal to other stations 50, as necessary. In addition, communication between the tracking device(s) 100 and the station(s) 50, or between stations 50 may be accomplished via, for example, a satellite, if the need exists. One skilled in the art will appreciate, however, that such system 400 may comprise one or more such tracking devices 100 where all such tracking devices 100 may be monitored from one or more stations 50. Accordingly, in some instances, the tracking device(s) 100 and/or the associated station(s) 50 may be provided with, for example, an appropriate identification code, which may also be monitored so as to allow discrimination between or indicate the particular tracking device(s) 100 being tracked, as will also be appreciated by one skilled in the art.

Thus, embodiments of the present invention allow, for example, a fleeing suspect in a vehicle to be remotely tracked, thereby obviating the need for a close pursuit by law enforcement while still providing for the suspect's location and movement to be monitored. In some instances, other methods for stopping the suspect such as spike strips and roadblocks may be more successful. In other instances, the suspect, without the pressure of a hot pursuit by law enforcement, may tend to drive more normally, thereby lessening the risk of damage, injury, and/or death as a result of such a chase. Still further, law enforcement resources may be allocated more efficiently toward apprehending the suspect, while inconvenience and risk to the public is decreased.

Many modifications and other embodiments of the invention set forth herein will come to mind to one skilled in the art to which this invention pertain having the benefit of the teachings presented in the foregoing descriptions and the associated drawings. For example, one skilled in the art will appreciate from the foregoing that an additional embodiment of the present invention may comprise a method for tracking a vehicle 350. More particularly, such a method would include deploying a tracking device 100 as described herein from the deployment vehicle 500 onto the vehicle 350 to be tracked, whereby the tracking device 100 is then secured to the vehicle 350 with the securing apparatus 250. Accordingly, upon receiving the location signal at the station 50, the vehicle 350 could be remotely tracked from the station 50 in response to the location signal. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A device adapted to track a vehicle, said device comprising:
   a location-determining apparatus configured to be capable of determining a location;
   a signaling device operably engaged with the location-determining apparatus and adapted to be capable of transmitting a signal, including a location signal corresponding to the location, to a station remotely disposed with respect to the location-determining apparatus;
   a housing configured to house the location-determining apparatus and the signaling device, the housing being configured to be deployable onto the vehicle from a remote location, the remote location being discrete with respect to the vehicle, while the vehicle is moving; and
   a securing apparatus operably engaged with the housing, the securing apparatus being configured to secure the housing, deployed from the remote location with respect to the vehicle, onto the moving vehicle so as to allow the vehicle to be remotely tracked from the station in response to the location signal.

2. A device according to claim 1 wherein the location-determining apparatus further comprises a Global Positioning System (GPS) device.

3. A device according to claim 1 further comprising at least one of an audio device capable of capturing an audio signal and a video device capable of capturing a video signal, the at least one of the audio and the video devices being operably engaged with the securing apparatus.

4. A device according to claim 3 wherein the at least one of the audio and the video devices is operably engaged with the signaling device and the signaling device is configured to be capable of transmitting at least one of the audio and the video signals.

5. A device according to claim 1 wherein the signaling device is further configured to be capable of receiving a signal from the station.

6. A device according to claim 5 further comprising at least one of an audio device capable of broadcasting an audio signal and a video device capable of broadcasting a video signal, the at least one of the audio and the video devices being operably engaged with the securing apparatus and capable of broadcasting the respective audio and video signals in response to the signal received from the station.

7. A device according to claim 1 wherein the signaling device is configured to be capable of communicating with the station by way of at least one of a wireless and a wireline communication system.

8. A device according to claim 1 wherein the securing apparatus further comprises at least one of an adhesive substance and a magnetic device.

9. A system adapted to track a vehicle, said system comprising:
   a tracking device, comprising:
      a location-determining apparatus configured to be capable of determining a location;

a signaling device operably engaged with the location-determining apparatus and adapted to be capable of transmitting a signal, including a location signal corresponding to the location, to a station remotely disposed with respect to the location-determining apparatus;

a housing configured to house the location-determining apparatus and the signaling device, the housing being configured to be deployable onto the vehicle from a remote location, the remote location being discrete with respect to the vehicle, while the vehicle is moving; and a securing apparatus operably engaged with the housing, the securing apparatus being configured to secure the housing, deployed from the remote location with respect to the vehicle, onto the moving vehicle; and a deployment vehicle comprising the remote location and configured to be capable of transporting the tracking device and deploying the tracking device onto the moving vehicle so as to thereby allow the securing apparatus to secure the tracking device to the moving vehicle such that the vehicle can be remotely tracked from the station in response to the location signal.

10. A system according to claim 9 wherein the location-determining apparatus further comprises a Global Positioning System (GPS) device.

11. A system according to claim 9 further comprising at least one of an audio device capable of capturing an audio signal and a video device capable of capturing a video signal, the at least one of the audio and the video devices being operably engaged with the securing apparatus.

12. A system according to claim 11 wherein the at least one of the audio and the video devices is operably engaged with the signaling device and the signaling device is configured to be capable of transmitting at least one of the audio and the video signals.

13. A system according to claim 9 wherein the signaling device is further configured to be capable of receiving a signal from the station.

14. A system according to claim 13 further comprising at least one of an audio device capable of broadcasting an audio signal and a video device capable of broadcasting a video signal, the at least one of the audio and the video devices being operably engaged with the securing apparatus and capable of broadcasting the respective audio and video signals in response to the signal received from the station.

15. A system according to claim 9 wherein the signaling device is configured to be capable of communicating with the station by way of at least one of a wireless and a wireline communication system.

16. A system according to claim 9 wherein the securing apparatus further comprises at least one of an adhesive substance and a magnetic device.

17. A system according to claim 9 wherein the deployment vehicle further comprises at least one of an unmanned aerial vehicle (UAV), a manned aerial vehicle, a ground vehicle, and a waterborne vehicle.

18. A method of tracking a vehicle with a tracking device comprising a location-determining apparatus configured to be capable of determining a location, a signaling device operably engaged with the location-determining apparatus and adapted to be capable of transmitting a signal, including a location signal corresponding to the location, to a station remotely disposed with respect to the location-determining apparatus, a housing configured to house the location-determining apparatus and the signaling device, and a securing apparatus operably engaged with the housing and configured to be capable of securing the housing, deployed from a remote and discrete disposition with respect to the vehicle, to the vehicle while the vehicle is moving, said method comprising:

deploying the tracking device from a deployment vehicle onto the moving vehicle, the deployment vehicle being remotely disposed and discrete with respect to the moving vehicles;

securing the tracking device, deployed from the remotely disposed and discrete deployment vehicle, to the moving vehicle with the securing apparatus;

receiving the location signal at the station; and remotely tracking the moving vehicle from the station in response to the location signal.

19. A method according to claim 18 wherein the location-determining apparatus further comprises a Global Positioning System (GPS) device capable of producing a GPS location signal and said receiving the location signal further comprises receiving the GPS location signal from the Global Positioning System (GPS) device via the signaling device.

20. A method according to claim 18 wherein the tracking device further comprises at least one of an audio device capable of capturing an audio signal and a video device capable of capturing a video signal, the at least one of the audio and video devices being operably engaged with the securing apparatus, and the method further comprises receiving at least one of the audio and the video signals at the station via the signaling device.

21. A method according to claim 18 wherein the signaling device is further configured to be capable of receiving a signal and the method further comprises transmitting a signal from the station to the tracking device via the signaling device.

22. A method according to claim 21 wherein the tracking device further comprises at least one of an audio device capable of broadcasting an audio signal and a video device capable of broadcasting a video signal, the at least one of the audio and the video devices being operably engaged with the securing apparatus, and the method further comprises broadcasting at least one of the audio and video signals in response to the signal received from the station.

23. A method according to claim 18 further comprising communicating between the tracking device and the station via the signaling device over at least one of a wireless and a wireline communication system.

24. A method according to claim 18 wherein said securing the tracking device to the vehicle further comprises securing the tracking device to the vehicle with at least one of an adhesive substance and a magnetic device.

25. A method according to claim 18 wherein said deploying the tracking device further comprises deploying the tracking device with at least one of an unmanned aerial vehicle (UAV), a manned aerial vehicle, a ground vehicle, and a waterborne vehicle.

* * * * *

(12) EX PARTE REEXAMINATION CERTIFICATE (5944th)
United States Patent
Chang

(10) Number: US 6,952,646 C1
(45) Certificate Issued: Oct. 9, 2007

(54) TRACKING DEVICE AND ASSOCIATED SYSTEM AND METHOD

(75) Inventor: Yu-Wen Chang, Rancho Palos Verdes, CA (US)

(73) Assignee: Chang Industry, Inc., La Verne, CA (US)

Reexamination Request:
No. 90/007,845, Dec. 15, 2005

Reexamination Certificate for:
Patent No.: 6,952,646
Issued: Oct. 4, 2005
Appl. No.: 10/438,302
Filed: May 14, 2003

(51) Int. Cl.
*G01C 21/00* (2006.01)
*G01C 21/34* (2006.01)
*G01S 1/02* (2006.01)
*G01S 1/00* (2006.01)

(52) U.S. Cl. ............. 701/207; 340/426.19; 342/357.07; 701/214

(58) Field of Classification Search ....................... None
See application file for complete search history.

(56) References Cited

U.S. PATENT DOCUMENTS

| | | | |
|---|---|---|---|
| 4,818,998 A | * | 4/1989 | Apsell et al. ............... 342/444 |
| 5,731,785 A | * | 3/1998 | Lemelson et al. ..... 342/357.07 |
| 6,246,323 B1 | | 6/2001 | Fischbach |
| 6,371,000 B1 | * | 4/2002 | Hutmacher et al. .......... 89/1.11 |
| 6,650,283 B2 | | 11/2003 | Brydges et al. |

\* cited by examiner

*Primary Examiner*—Peter C. English

(57) ABSTRACT

A system for tracking a vehicle is provided. Such a system comprises a tracking device including a location-determining apparatus configured to determine a location, a signaling device operably engaged with the location-determining apparatus and adapted to transmit a signal, including a location signal corresponding to the location, to a station remotely disposed with respect to the location-determining apparatus, and a securing apparatus operably engaged with the location determining apparatus and adapted to secure the location-determining apparatus to the vehicle while the vehicle is moving. A deployment vehicle is configured to transport the tracking device and deploy the tracking device onto the vehicle so as to thereby allow the securing apparatus to secure the tracking device to the vehicle such that the vehicle can be remotely tracked from the station in response to the location signal. An associated device and method are also provided.

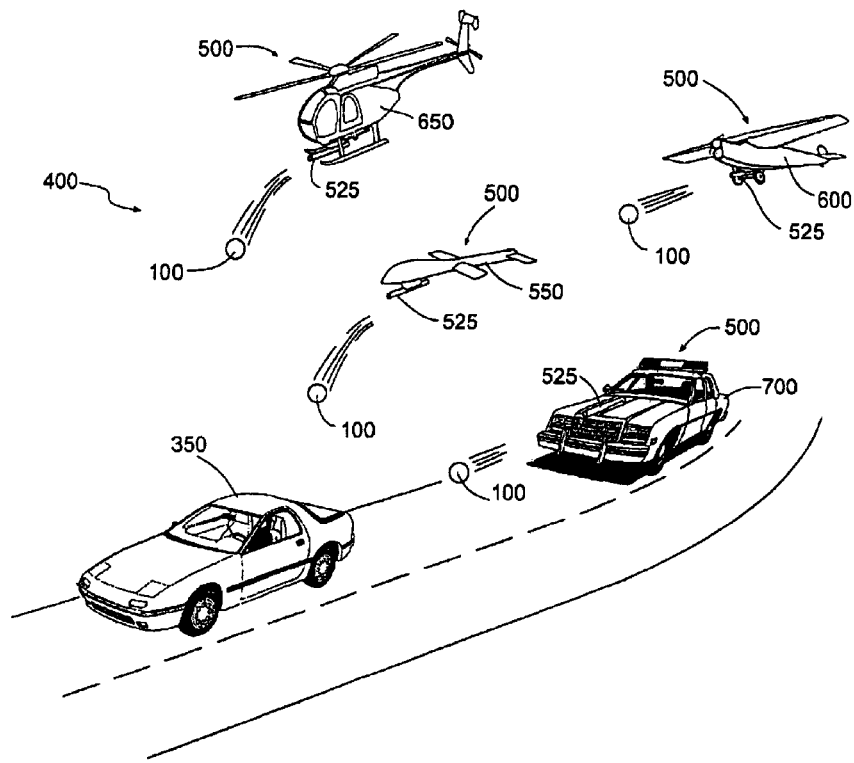

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4, lines 7–36:

In some particularly advantageous embodiments, the securing device 250 is attached to or otherwise operably engaged with the housing 125. However, in other instances, the securing device 250 may be attached to or otherwise operably engaged with the location-determining device 150 and/or the signaling device 200, or a separate securing device 250 may be attached to each of the location-determining device 150 and the signaling device 200, as will be appreciated by one skilled in the art. The securing device 250 is particularly configured so as to attach or otherwise secure the housing 125, the location-determining device 150, and/or the signaling device 200 to a vehicle 350 driven, for example, by a suspect fleeing from law enforcement officers. The securing device 250 may comprise, for example, a magnetic [apparatus] *device* configured to magnetically attach the housing 125, the location-determining device 150, and/or the signaling device 200 to the vehicle 350 without interfering with the operation of the location-determining device 150 and/or the signaling device 200. [In other instances, the] *The* securing device 250 may *further* comprise, for example, an adhesive substance, *in addition to the magnetic device,* for attaching the housing 125, the location-determining device 150, and/or the signaling device 200. Such an adhesive substance may be, for example, permanent or nonremovable, require a particular solvent for removal thereof, or otherwise temporary, wherein a temporary adhesive substance may require, for instance, a certain removal force to be applied thereto or a particular extent of environmental degradation to occur in order to allow the securing device 250 to be removed from the vehicle 350.

AS A RESULT OF REEXAMINATION, IT HAS BEEN DETERMINED THAT:

Claims 1–25 are cancelled.

* * * * *